Reissued Jan. 5, 1932

Re. 18,312

UNITED STATES PATENT OFFICE

GUSTAVUS J. ESSELEN, JR., OF SWAMPSCOTT, MASSACHUSETTS, AND REED P. ROSE, OF JACKSON HEIGHTS, NEW YORK, ASSIGNORS TO GENERAL RUBBER COMPANY, OF NEW YORK, N. Y., A CORPORATION OF NEW JERSEY

COATED PAPER

No Drawing. Original application filed March 19, 1924, Serial No. 700,426. Divided and this application filed April 8, 1925. Serial No. 21,700. Patent No. 1,746,888, dated February 11, 1930. Application for reissue filed September 1, 1931. Serial No. 560,656.

This invention relates to coated papers. Papers of this type are ordinarily employed where the definition of a printed picture, letter, etc. must be clear. Such a paper should possess a surface which resists absorption of ink and colors applied thereto. It should also resist wear and tear even after constant flexing. Heretofore coated papers have been made by applying to the surface of a suitable paper a mixture of a finely divided mineral such as clay, blanc fixe, etc. with or without a pigment, together with an adhesive which ordinarily consists in large part of casein. Glue and starch have also been tried as adhesives, but casein has been the material preferred. The coated papers heretofore made have, however, had surfaces whose resistance to ink absorption as well as their wearing qualities have been susceptible to improvement. Papers heretofore produced have also been somewhat expensive due particularly to the use of casein as the binder.

The principal object of the present invention accordingly is to provide a coated paper which shall have a higher resistance to ink absorption than papers heretofore produced, which shall be stronger and better able to withstand flexing, in which there shall be good adhesion between the coating and paper, and which shall be less expensive than previous coated paper.

The invention accordingly comprises paper, coated with a mixture comprising rubber latex and a filler material (usually finely divided clay or other mineral or mixtures of materials) with or without other organic binder or binders such as starch or casein.

In carrying out the invention in its preferred form, 25 lbs. of starch previously boiled up with 20 gals. of water are carefully and thoroughly mixed with 100 lbs. of a finely divided clay. This mixture is preferably allowed to stand several hours before use. It is important that the clay be thoroughly dispersed. Latex containing say 1% of ammonia as a preservative in sufficient amount to produce 1.25 lbs. of rubber solids is then carefully stirred into the mixture of starch and clay. The latex is thoroughly mixed with the mass of starch and clay and sufficient water is added to obtain a consistency necessary for proper working on the particular type of coating-machine employed. This mixture is then applied to a web of paper in the usual manner. The paper so treated is dried and may be calendered or subjected to other processes ordinarily employed in the production of coated paper.

The embodiment just given including latex and starch is preferred among other reasons on account of its low cost. Similar results have been obtained substituting glue in part or entirely for starch. An embodiment of the invention employing glue is as follows: 0.3 lbs. glue are dissolved in water and thoroughly mixed with 100 lbs. of finely divided clay. Similar precautions are to be observed as given in the preceding example in mixing these materials. To this mixture is then added an amount of rubber latex, containing 1% ammonia as a preservative, sufficient to contain 33 lbs. of rubber solids. After thorough mixing of the latex and other materials, sufficient water is added to give a proper consistency for use with the particular type of coating machine employed. A web of paper is coated as mentioned in the last example, dried, calendered and otherwise treated in the usual manner to produce a coated paper.

Another example employing casein is as follows: 10 lbs. of casein are dissolved in the usual manner with the help of 1 lb. of borax or suitable amounts of other alkali. The resulting solution is thoroughly mixed with 100 lbs. of finely divided clay, with the precautions mentioned heretofore. Thereafter sufficient latex, containing 1% ammonia as a preservative, to produce 2 lbs. of rubber solids, is combined with this mixture. The mixture so prepared is then applied to paper treated as heretofore by the usual processes to produce a coated paper.

Another example employing rubber latex and shellac dissolved by means of borax is as follows: 15 lbs. of shellac are dispersed in 3 gals. of water containing 3 lbs. of borax. With this is carefully mixed 100 lbs. of finely divided clay. To this mixture is carefully added sufficient latex containing approximately 1% ammonia as a preservative to produce 5 lbs. of rubber solids. The mixture so obtained is applied in the usual manner to paper to produce a coated paper.

be incorporated with the coating mixture or may be applied before, during or after coating and vulcanization may be carried out, preferably at temperatures below 200° F.

The appearance of the coated papers produced by the above processes is similiar to the appearance of other commercial coated papers, but their properties are quite different. The papers of the present invention resist absorption of blotting of ink 5 to 15% greater than other coated papers. In addition they are superior to the ordinary coated papers in resistance to wear. As an index to the increase in strength of paper the following data determined by the folding test was obtained on papers of equal weights:

*Folding test*

| Rubber solids | Other components | Number of times folded before tearing occurred | | | |
|---|---|---|---|---|---|
| | | Not calendered | | Calendered | |
| | | Machine | Cross | Machine | Cross |
| None. | Casein 20 lbs., clay 100 lbs. | Folded 13 times. | Folded 5 times. | Folded 33 times. | Folded 6 times. |
| 1.25 lbs. | Starch 25 lbs., clay 100 lbs. | Folded 13 times. | Folded 8 times. | Folded 17 times. | Folded 12 times. |
| 2.5 lbs. | Casein 10 lbs., clay 100 lbs. | Folded 22 times. | Folded 6 times. | Folded 35 times. | Folded 23 times. |
| 6.25 lbs. | Starch 12½ lbs., clay 100 lbs. | Folded 52 times. | Folded 18 times. | Folded 59 times. | Folded 21 times. |
| 10 lbs. | Borated shellac 10 lbs., clay 100 lbs. | Folded 38 times. | Folded 21 times. | Folded 93 times. | Folded 37.5 times. |
| 14 lbs. | Glue 1% of rubber solids, clay 100 lbs | Folded 30.5 times. | Folded 28 times. | Folded 104 times. | Folded 26 times. |

It will be understood that other finely divided mineral substances than clay may be employed in the above procedures. For example we may use, to replace at least a portion of the clay, one or more of the following substances: Satin white which is largely a mixture of calcium sulphate and aluminum hydrate, blanc fixe which is largely barium sulphate, and Paris white which is largely calcium carbonate or other suitable materials.

Our experience in preparing coating mixtures including clay is that better results are obtained when the total quantity of rubber solids plus other binder is present in amounts greater than 12% of the weight of the clay. This quantity of course will vary somewhat in accordance with the kind of clay employed and in case clay is substituted in whole or in part by other materials a similar variation in the percentage of binder will occur.

It has been observed in mixtures of latex and starch as given in the preferred embodiment that the larger the proportion of latex used with respect to the starch the less total amount of binder is required to give a satisfactory product. For example a mixture containing 12% starch and 6.25% rubber solids based on the weight of the clay gives a somewhat more satisfactory product than a mixture containing 20% of starch and only 2% of rubber solids.

Other preservatives than ammonia may be used.

If desired, material for vulcanization may

The above folding data was obtained according to standard procedure on a Schopper machine.

Another important characteristic of coated papers is that the coating material shall adhere firmly to the paper. Coatings employing casein alone have good adherence to the paper with which they are employed and it has been found that the coatings of the present invention adhere as well or better than the casein coatings heretofore used. In addition it has been found that the coated papers of the present invention are less expensive to manufacture than those heretofore prepared. For example papers employing starch and latex manufactured according to the preferred example above are produced at a cost of somewhat less than one-half that required for the production of good casein-coated paper.

As many apparently widely different embodiments of this invention may be made without departing from the spirit thereof, it will be understood that we do not intend to limit ourselves to the specific embodiments herein set forth except as indicated in the appended claims.

Having thus described our invention, what we claim and desire to protect by Letters Patent is:

1. A coated paper consisting of paper coated with a mixture of rubber latex and filling material including a shellac product and a dispersing agent therefor.

2. A coated paper consisting of paper coated with a mixture of rubber latex and filling material including a borated shellac.

3. A coated paper consisting of paper coated with a mixture comprising rubber latex, clay, and shellac treated with borax.

4. A coated paper consisting of paper coated with a mixture comprising a major proportion of clay, and rubber solids of latex and borated shellac in minor proportion.

5. A coated paper consisting of paper coated with a mixture comprising clay, rubber solids of latex, an adhesive from the group consisting of borated shellac, casein, starch and glue, the clay being in proportion greater than any other ingredient, and the rubber solids of latex and adhesive being in minor proportion of the composition.

6. A coated paper consisting of paper coated with clay, rubber solids of latex, and an adhesive from the group consisting of borated shellac, casein and starch, in proportions by weight of approximately 1.25 to 10 parts rubber solids of latex, and 10 to 25 parts said adhesive, to 100 parts clay.

7. A coated paper consisting of paper coated with mineral filler material containing clay, at least a portion of which is replaceable with one or more of the substances, satin white, blanc fixe, and Paris white, rubber solids of latex, and an adhesive from the group consisting of borated shellac, casein, and starch, in proportions by weight of approximately 1.25 to 10 parts rubber solids of latex, and 10 to 25 parts said adhesive, to 100 parts mineral filler material.

8. A coated paper consisting of paper coated with a mixture comprising a major proportion of mineral filler material containing clay, at least a portion of which is replaceable with one or more of the substances, satin white, blanc fixe, and Paris white, a minor proportion of rubber solids of latex, and an adhesive from the group consisting of borated shellac, casein and starch in the proportion of 10 to 25 parts said adhesive to 100 parts said mineral filler material.

9. A coated paper consisting of paper coated with a mixture comprising a major proportion of clay, and rubber solids of latex and an adhesive, the rubber solids of latex and adhesive being in minor proportion and in amount greater than 12% of the weight of the clay.

10. A coated paper consisting of paper coated with a mixture comprising a major proportion of mineral filler material containing clay, at least a portion of which is replaceable with one or more of the substances, satin white, blanc fixe, and Paris white, and rubber solids of latex and adhesive, the rubber solids of latex and adhesive being in minor proportion and in amount greater than 12% of the weight of the mineral filler material.

11. A coated paper consisting of paper coated with a mixture of at least 75 per cent clay by weight and including rubber solids of latex and an adhesive in minor proportion.

12. A coated paper consisting of paper coated with a mixture comprising a major proportion of clay and a minor proportion of rubber solids of latex and adhesive.

Signed at Boston, in the county of Suffolk, and State of Massachusetts, this 18th day of August, 1931.

GUSTAVUS J. ESSELEN, Jr.

Signed at New York, in the county and State of New York, this 6th day of August, 1931.

REED P. ROSE.